(12) United States Patent
Shapiro et al.

(10) Patent No.: US 11,073,330 B2
(45) Date of Patent: Jul. 27, 2021

(54) POWER DISTRIBUTION FOR END-POINT FAILURE DETECTION AND RECOVERY FOR A TRANSPORT REFRIGERATION SYSTEM

(71) Applicant: Carrier Corporation, Palm Beach Gardens, FL (US)

(72) Inventors: Aryn Shapiro, Syracuse, NY (US); Thomas DeWolf, Clay, NY (US); Daniel L. Waser, Liverpool, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 170 days.

(21) Appl. No.: 16/271,594

(22) Filed: Feb. 8, 2019

(65) Prior Publication Data

US 2019/0242642 A1    Aug. 8, 2019

Related U.S. Application Data

(60) Provisional application No. 62/628,092, filed on Feb. 8, 2018.

(51) Int. Cl.
*F25D 29/00* (2006.01)
*H02J 9/06* (2006.01)
(Continued)

(52) U.S. Cl.
CPC ....... *F25D 29/003* (2013.01); *B60H 1/00428* (2013.01); *B60H 1/3232* (2013.01);
(Continued)

(58) Field of Classification Search
CPC .............. B60H 1/00428; B60H 1/3232; B60H 1/00792; B60H 2001/3252;
(Continued)

(56) References Cited

U.S. PATENT DOCUMENTS 4,663,725 A    5/1987  Truckenbrod
5,036,455 A    7/1991  Atwood
(Continued)

FOREIGN PATENT DOCUMENTS

WO    2017176682 A1    10/2017

OTHER PUBLICATIONS

European Search Report for application 19155785.9, dated Jul. 17, 2019, 100 pages.
(Continued)

*Primary Examiner* — Larry L Furdge
(74) *Attorney, Agent, or Firm* — Cantor Colburn LLP

(57) ABSTRACT

A transport refrigeration system including a method for fault tolerant power management. The system includes a first sensor identified as required for operation of the transport refrigeration system and a second sensor operable as a backup for the first sensor. The system also includes a first power supply operably connected to the first sensor and configured to operate the first sensor and a second power supply operably connected to the second sensor and configured to operate the second sensor. The system further includes a controller operably connected to at least the first power supply as well as the first sensor and the second power supply as well as the second sensor, the controller configured to monitor at least the first power supply and the second power supply, if a fault is detected in the first power supply, operate the transport refrigeration system from the second sensor.

20 Claims, 7 Drawing Sheets

(51) Int. Cl.
*B60H 1/32* (2006.01)
*B60H 1/00* (2006.01)

(52) U.S. Cl.
CPC ............ *H02J 9/06* (2013.01); *B60H 1/00792* (2013.01); *B60H 2001/325* (2013.01); *B60H 2001/3251* (2013.01); *B60H 2001/3252* (2013.01)

(58) Field of Classification Search
CPC ...... B60H 2001/325; B60H 2001/3251; F25D 29/003; F25D 49/02; Y02T 10/88; H02J 9/06
See application file for complete search history.

(56) References Cited

U.S. PATENT DOCUMENTS

| | | | |
|---|---|---|---|
| 5,664,089 | A | 9/1997 | Byers et al. |
| 6,597,073 | B1 | 7/2003 | Check |
| 6,703,722 | B2 | 3/2004 | Christensen |
| RE39,710 | E | 7/2007 | Young et al. |
| 7,349,829 | B1 | 3/2008 | Lawlor et al. |
| 7,432,615 | B2 | 10/2008 | Hjort |
| 7,508,093 | B2 | 3/2009 | Wiedenuth et al. |
| 7,709,975 | B2 | 5/2010 | Kuo |
| 8,212,401 | B2 | 7/2012 | Linkhart et al. |
| 8,295,950 | B1 | 10/2012 | Wordsworth et al. |
| 8,421,270 | B1 | 4/2013 | Miller et al. |
| 8,738,268 | B2 | 5/2014 | Karimi et al. |
| 9,331,479 | B2 | 5/2016 | Imai et al. |
| 9,444,356 | B2 | 9/2016 | Emoto et al. |
| 9,673,624 | B2 | 6/2017 | Emoto et al. |
| 9,762,058 | B2 | 9/2017 | Youn et al. |
| 9,787,181 | B2 | 10/2017 | Hasegawa et al. |
| 2003/0029179 | A1 | 2/2003 | Vander Woude et al. |
| 2006/0042296 | A1* | 3/2006 | Ludwig .................. F25D 29/00 62/323.4 |
| 2006/0248904 | A1 | 11/2006 | Ludwig |
| 2012/0247138 | A1* | 10/2012 | Senf, Jr. ................. F25B 49/02 62/191 |
| 2013/0257159 | A1 | 10/2013 | Wang et al. |
| 2013/0325323 | A1* | 12/2013 | Breed ................ G01C 21/3667 701/420 |
| 2014/0208785 | A1* | 7/2014 | Wallace .................. F25B 49/02 62/115 |
| 2014/0229062 | A1 | 8/2014 | Kimura et al. |
| 2015/0039134 | A1 | 2/2015 | Nikaido et al. |
| 2016/0379768 | A1 | 12/2016 | Pham et al. |
| 2018/0029436 | A1 | 2/2018 | Zaeri et al. |
| 2019/0025097 | A1* | 1/2019 | Rusignuolo ........... F25D 29/003 |

OTHER PUBLICATIONS

Singapore Office Action for Application No. 10201901086P; dated Dec. 5, 2019; 2 Pages.

* cited by examiner

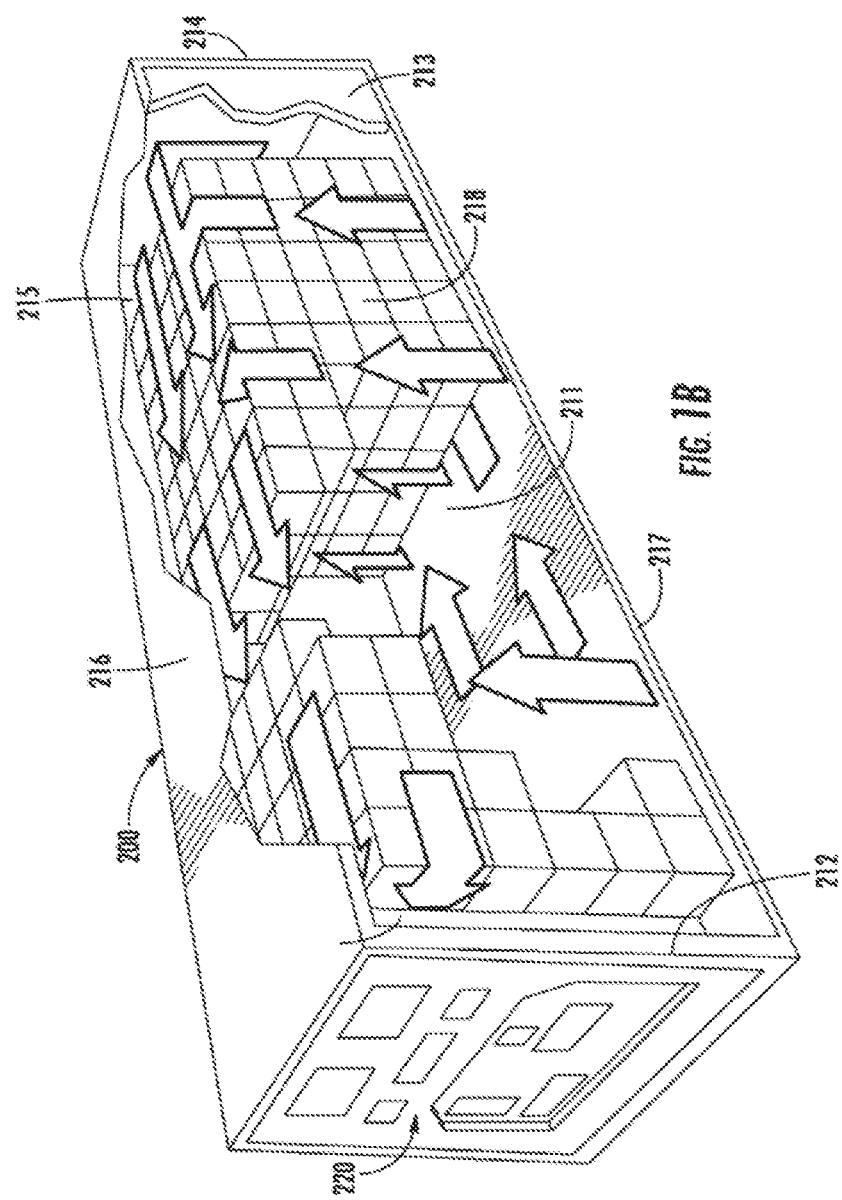

POWER DISTRIBUTION FOR END-POINT FAILURE DETECTION AND RECOVERY FOR A TRANSPORT REFRIGERATION SYSTEM

CROSS-REFERENCE TO RELATED APPLICATIONS

This application claims the benefit of 62/628,092 filed Feb. 8, 2018, which is incorporated herein by reference in its entirety.

TECHNICAL FIELD

The present disclosure relates to a method and system for distributed network of power supplies that group components of the system by criticality, ensuring primary and functionally redundant components are not powered by the same power supply. More particularly, isolating critical and non-critical components to ensure system operation should a given component or power supply become inoperative.

BACKGROUND

A typical refrigerated shipping container, cargo truck or refrigerated truck trailer, such as those utilized to transport a cargo via sea, rail or road, is a container, truck, or trailer having a cargo compartment, modified to include a refrigeration system located at one end of the container, truck, or trailer. The refrigeration system includes a compressor, condenser, expansion valve and evaporator serially connected by refrigerant lines in a closed refrigerant circuit in accord with known refrigerant vapor compression cycles. A power unit, which could include an engine and/or an AC power system, drives the compressor of the refrigeration system. In truck/trailer applications the power unit is typically diesel powered, or in other applications natural gas powered. In many container and/or truck/trailer transport refrigeration systems, the compressor is driven by the engine shaft either through a belt drive or by a mechanical shaft-to-shaft link. In other systems, the engine drives a generator that generates electrical power, which in turn drives the compressor. In container systems the compressor is driven directly by an external power source, for example a 380/460 VAC AC power system, though other configurations are possible.

Manufacturers and operators of fleets of refrigerated containers, refrigerated trucks, and refrigerated truck trailers desire to maximize operational efficiency of not only the refrigeration system, but of the container, truck, or tractor trailer system as a whole. Moreover, operational readiness is critical to effective and efficient operation. System downtime directly impacts profitability and results in untimely deliveries as well as potential loss of perishables. In some instances, certain faults of system components may lead to system failure due to cascading effects. Avoiding system failures where possible ensures efficient operation and avoids loses as a consequence of such a failure.

BRIEF DESCRIPTION

According to one embodiment described herein is a transport refrigeration system including a method for fault tolerant power management. The system includes a first sensor identified as required for operation of the transport refrigeration system and a second sensor operable as a backup for the first sensor. The system also includes a first power supply operably connected to the first sensor and configured to operate the first sensor and a second power supply operably connected to the second sensor and configured to operate the second sensor. The system further includes a controller operably connected to at least the first power supply as well as the first sensor and the second power supply as well as the second sensor, the controller configured to monitor at least the first power supply and the second power supply, if a fault is detected in the first power supply, operate the transport refrigeration system from the second sensor.

In addition to one or more of the features described above, or as an alternative, further embodiments may include that the first sensor is at least one of a discharge pressure sensor, a flash tank pressure sensor, and an evaporator pressure sensor.

In addition to one or more of the features described above, or as an alternative, further embodiments may include that the second sensor is at least one of a condenser pressure sensor, a mid-stage pressure sensor, and a compressor suction port pressure sensor.

In addition to one or more of the features described above, or as an alternative, further embodiments may include at least one of a fourth sensor and a fifth sensor, the at least one of the fourth and the fifth sensor operably connected to the first power supply.

In addition to one or more of the features described above, or as an alternative, further embodiments may include that at least one of the fourth sensor and the fifth sensor is at least one of a discharge pressure sensor, a flash tank pressure sensor, and an evaporator pressure sensor.

In addition to one or more of the features described above, or as an alternative, further embodiments may include at least one of a sixth sensor and a seventh sensor, the at least one of the sixth sensor and the seventh sensor operably connected to the second power supply.

In addition to one or more of the features described above, or as an alternative, further embodiments may include at least one of the sixth sensor and the seventh sensor is at least one of a condenser pressure sensor, a mid-stage pressure sensor, and a compressor suction port pressure sensor.

In addition to one or more of the features described above, or as an alternative, further embodiments may include that if a fault is detected in the second power supply, operate the transport refrigeration system from the first sensor.

In addition to one or more of the features described above, or as an alternative, further embodiments may include that the third power supply is independent of the first power supply and the second power supply.

In addition to one or more of the features described above, or as an alternative, further embodiments may include that the first power supply is independent of the second power supply.

In addition to one or more of the features described above, or as an alternative, further embodiments may include at least one of an evaporator fan and a compressor operably connected to a source of AC power.

In addition to one or more of the features described above, or as an alternative, further embodiments may include that the source of AC power includes an engine and a generator.

Also described herein in an embodiment is a method of fault tolerant power distribution for a transport refrigeration system. The method including identifying a first sensor as required for operation of the transport refrigeration system, identifying a second sensor operable as a backup for the first sensor, and identifying a third sensor as not required for operation of the transport refrigeration system. The method also includes operating the first sensor from a first power supply operably connected to the first sensor, operating a second sensor from a second power supply operably connected to the second sensor, and operating the third sensor from a third power supply operably connected to the third sensor. Furthermore, the method includes monitoring at least the first power supply and the second power supply, the first power supply as well as the first sensor and the second power supply as well as the second sensor operably connected to a controller, if a fault is detected in the first power supply, operating the transport refrigeration system from the second sensor.

In addition to one or more of the features described above, or as an alternative, further embodiments may include that the first sensor is at least one of a discharge pressure sensor, a flash tank pressure sensor, and an evaporator pressure sensor.

In addition to one or more of the features described above, or as an alternative, further embodiments may include that the second sensor is at least one of a condenser pressure sensor, a mid-stage pressure sensor, and a compressor suction port pressure sensor.

In addition to one or more of the features described above, or as an alternative, further embodiments may include operably connecting at least one of a fourth sensor and a fifth sensor to the first power supply.

In addition to one or more of the features described above, or as an alternative, further embodiments may include that at least one of the fourth sensor and the fifth sensor is at least one of a discharge pressure sensor, a flash tank pressure sensor, and an evaporator pressure sensor.

In addition to one or more of the features described above, or as an alternative, further embodiments may include that at least one of a sixth sensor and a seventh sensor, the at least one of the sixth sensor and the seventh sensor operably connected to the second power supply.

In addition to one or more of the features described above, or as an alternative, further embodiments may include that at least one of the sixth sensor and the seventh sensor is at least one of a condenser pressure sensor, a mid-stage pressure sensor, and a compressor suction pressure sensor.

In addition to one or more of the features described above, or as an alternative, further embodiments may include that if a fault is detected in the second power supply, operating the transport refrigeration system from the first sensor.

In addition to one or more of the features described above, or as an alternative, further embodiments may include that the third power supply is independent of the first power supply and the second power supply.

In addition to one or more of the features described above, or as an alternative, further embodiments may include that the first power supply is independent of the second power supply.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The foregoing and other features and advantages of embodiments are apparent from the following detailed description taken in conjunction with the accompanying drawings in which:

FIG. 1B is a perspective view of a refrigerated container having a refrigeration unit integrated with the container in accordance with an embodiment;

DETAILED DESCRIPTION

Figure 1A:
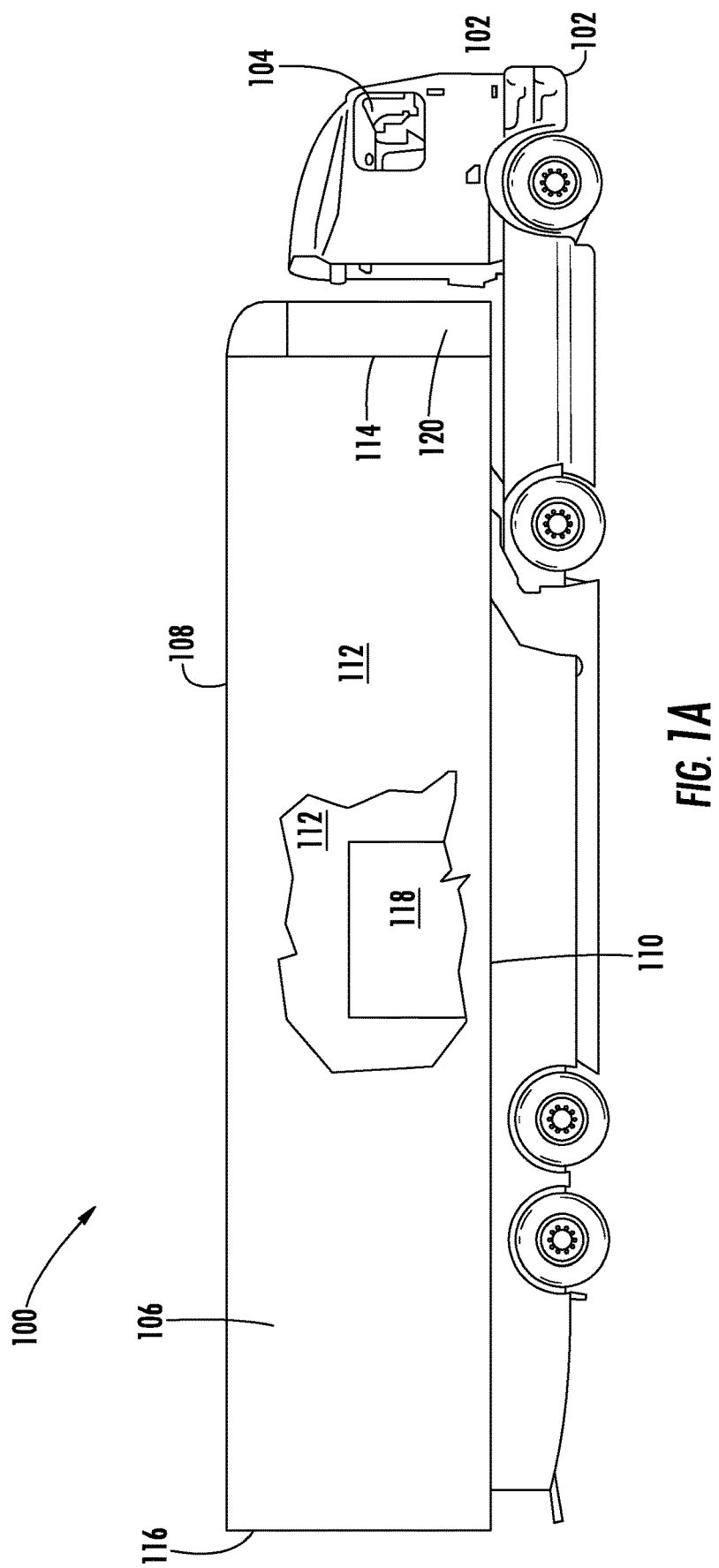
FIG. 1A depicts a container, truck or trailer transport refrigeration system and a cargo compartment in accordance with an embodiment.

In general, embodiments herein relate generally to load segregation and power supply distribution to ensure a cost effective level of operability in the aftermath of selected faults. In particular separate power supplies of the power system provide for power for the system with selected loads segregated to ensure system operability or partial operability sufficient to enable an operator the opportunity to obtain service if needed. In an embodiment selected loads are segregated based on their system criticality. A goal of the segregation being to ensure that any given failure does not cause a system to become inoperative. Moreover the system will provide an intelligent diagnostics associated with the individual power supplies to facilitate independent control. Such an architecture improves the function of the system in various operating modes by increasing efficiency and improving system availability and reliability.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

FIG. 1A is an embodiment of a tractor trailer system 100. The tractor trailer system 100 includes a tractor 102 including an operator's compartment or cab 104 and also including an engine, which acts as the drive system of the tractor trailer system 100. A trailer 106 is coupled to the tractor 102. The trailer 106 is a refrigerated trailer 106 and includes a top wall 108, a directly opposed bottom wall 110, opposed side walls 112, and a front wall 114, with the front wall 114 being closest to the tractor 102. The trailer 106 further includes a door or doors (not shown) at a rear wall 116, opposite the front wall 114. The walls of the trailer 106 define a cargo compartment. The trailer 106 is configured to maintain a cargo 118 located inside the cargo compartment at a selected temperature through the use of a transport refrigeration system 120 located on the trailer 106. The transport refrigeration system 120, as shown in FIG. 1A, is located at or attached to the front wall 114.

The trailer 106 is configured to maintain a cargo 118 located inside the cargo compartment at a selected temperature through the use of a transport refrigeration system 120 located on the trailer 106. The transport refrigeration system 120, as shown in FIG. 1, is located at or attached to the front wall 114.

Referring also to FIG. 1B, there is depicted a refrigerated shipping container, generally referenced 200, having a transport refrigeration unit 220 attached to or integrated with the structural frame of the container 200 at a front wall 212 thereof. The cargo container 200 has a box-like structure formed of a forward or front wall 212, a back or rear wall 214 spaced longitudinally from the forward wall 212, a pair of opposed sidewalls 213 and 215 that extend longitudinally between the forward wall 212 and the rear wall 214, a roof panel 216 that extends longitudinally between an upper region of the forward wall 212 and an upper region of the rear wall 214 and that extends transversely between upper regions of the respective opposed side walls 213, 215, and a floor 217 that extends longitudinally between a lowermost region of the forward wall 212 and a lowermost region of the rear wall 214 and that extend transversely between lowermost regions of the respective opposed side walls 213, 215.

The box-like structure of the container 200 defines a cargo space 211 in which the bins, cartons or pallets of cargo 218 being transported are stacked on the floor 218. The rear wall 214 is provided with one or more doors (not shown) through which access to the cargo space may be had for loading the cargo 218 into the container 200. When the doors are closed, a substantially air-tight, sealed cargo space 211 is established within the container 200 which prevents inside air from escaping the cargo space 211. The container 200 is configured to maintain a cargo 218 located inside the cargo space 211 at a selected temperature through the use of a transport refrigeration system 220 located on the container 200.

Figure 2:
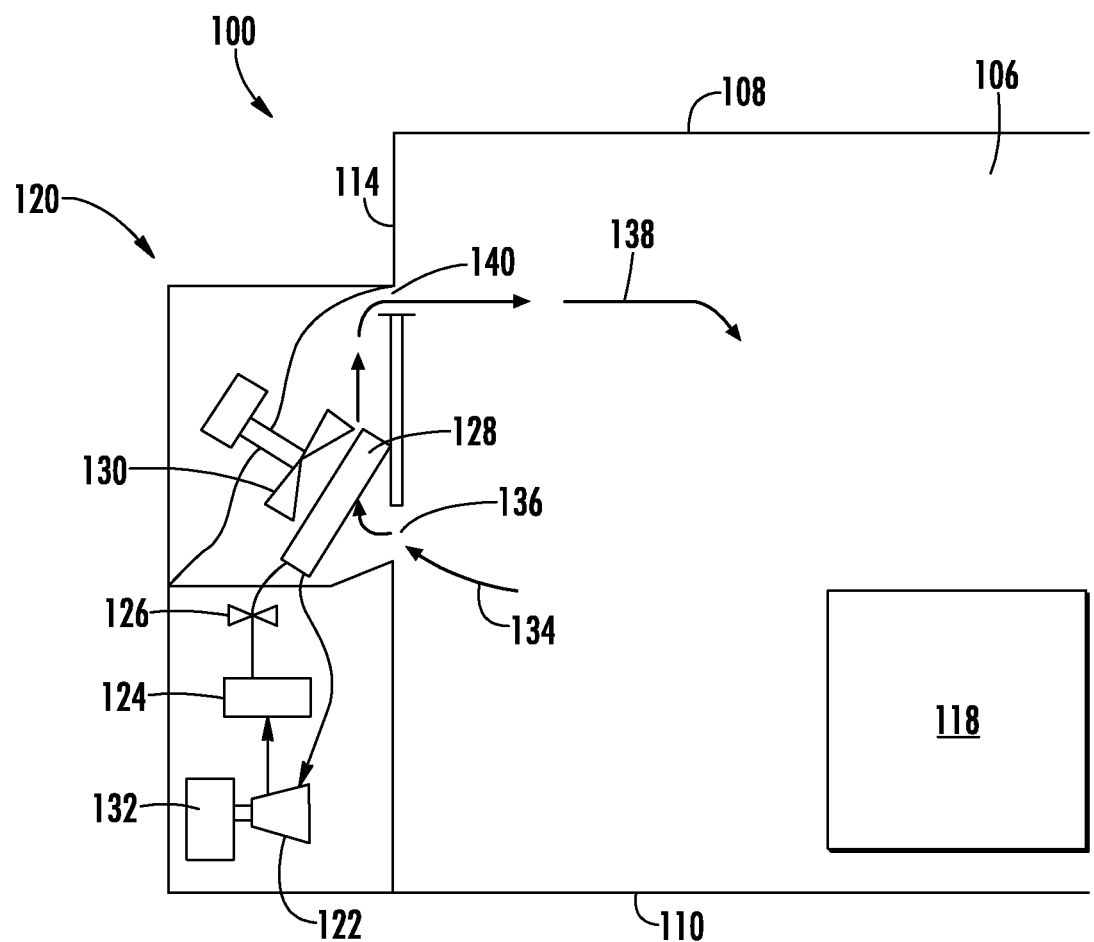
FIG. 2 depicts a transport refrigeration system for a container, truck, or tractor trailer system of FIGS. 1A and 1B in accordance with an embodiment.

Referring now to FIG. 2, the transport refrigeration system 120, 220 is shown in more detail as may be employed in a truck/trailer configuration of FIG. 1A or a transport container 200 of FIG. 1B. The transport refrigeration system 120, 220 includes a compressor 122, a condenser 124, an expansion valve 126, an evaporator 128, and an evaporator fan 130 operating in a vapor compression cycle. Refrigerant is compressed at the compressor 122 and circulated through an expansion valve and evaporator 128 to provide cooling of airflow from the cargo compartment. The compressor 122 is operably connected to an AC power source 132 which drives the compressor 122 or belt driven as in truck applications. In some applications the compressor 122 is driven from a DC power source. The AC power source 132 may include an engine and a generator as in trailer applications and as described herein.

Airflow is circulated into and through the cargo space (e.g., 211) of the trailer 106 or container 200 by means of the transport refrigeration system 120, 220. A return airflow 134 flows into the transport refrigeration system 120, 220 from the cargo compartment of the trailer 106 or container 200 through a refrigeration system inlet 136, and across the evaporator 128 via the evaporator fan 130, thus cooling the return airflow 134. The cooled return airflow 134, now referred to as supply airflow 138, is supplied into the cargo compartment of the trailer 106 through a refrigeration system outlet 140, which in some embodiments is located near the top wall 108 of the trailer 106 (or 216 for the container 200). The supply airflow 138 cools the cargo 118, 218 in the cargo compartment of the trailer 106 or container 200 respectively.

Figure 3:
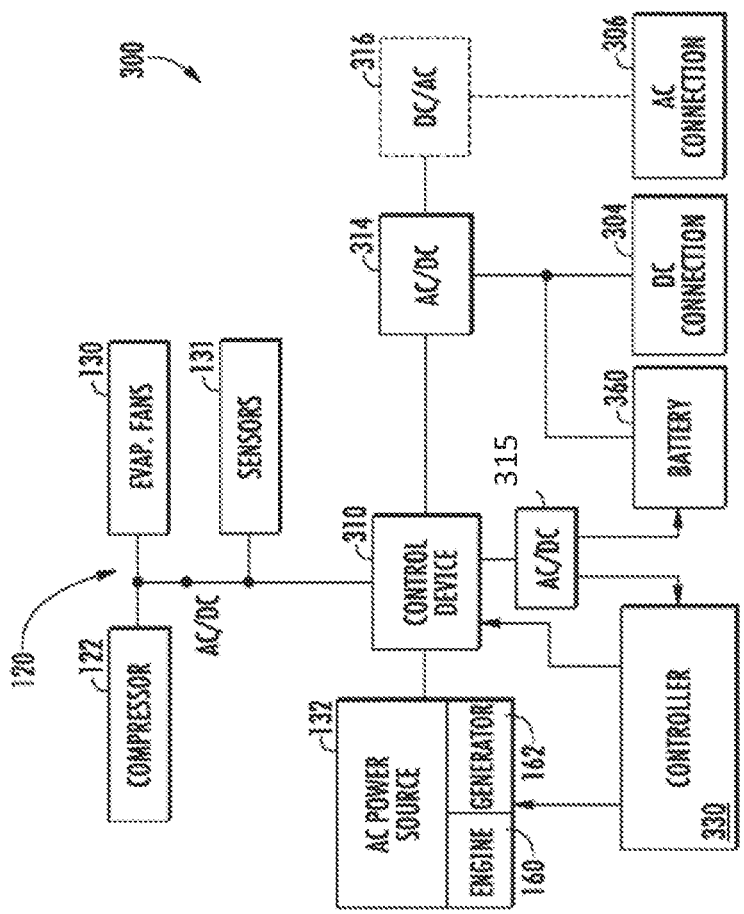
FIG. 3 depicts a transport refrigeration power system in accordance with an embodiment.

FIG. 3 depicts a conventional transport refrigeration system power system 300 for outputting conditioned, regulated power and/or for charging a battery. Shown in FIG. 3 is AC power source 132. As described above, the AC power source 132 may include an internal combustion engine 160 (e.g., a diesel engine) and a generator that produces unregulated AC power. In other embodiments, the AC power is externally supplied. Further in some embodiments the transport refrigeration system is configured to operate from a DC source, including a battery. In an exemplary embodiment, the generator 162 generates unregulated, three-phase AC power, typically with no regulation ability other than controlling the speed of engine 160. A controller 330 controls various aspects of the transport refrigeration system 120, 220 and the transport refrigeration power system 300. Controller 330 may receive a variety of signals from sensor(s) 131 that provide insight and information about the operation of the transport refrigeration system 120, 220 and characteristics of the refrigeration cycle as the system 120, 220 operates. Controller 330 may also command valves and actuators as needed to vary the operation of the transport refrigeration system 120, 220 and characteristics of the refrigeration cycle as the system 120, 220 operates and to modify aspects and characteristics of the system operation. Controller 330 can vary the speed of engine 160 depending on which mode of operation is selected. Controller 330 also controls a control device 310 as well as other components and aspects of the system 300 as described herein.

The transport refrigeration system power system 300 includes a control device 310 that connects the output of AC power source 132 to selected loads during various modes of operation of the transport refrigeration system 120, 220. The power control unit 310 is configured to control and direct application and routing of power to various subsystem components e.g., compressor 122, sensors 123, evaporator fans, 130, and the like. In addition, the power control unit 310 may control the routing of power to and from the battery 360, as well as the routing and maintenance of power to the control unit 330 for the transport refrigeration power system 300. In addition one embodiment the control device 310 connects the output of AC power source 132 to auxiliary power connections, such as one or more DC power connections 304 and/or one or more AC power connections 306. For example, when the control device 310 is operating in a first mode, the output of the AC power source 132 is connected to the compressor 122 and evaporator fan 130, (among other loads), of the transport refrigeration system 120, 220. When the control device 310 is in a second mode, the output of the AC power source 132 is connected to power conditioning modules 314, 315 and 316, which are connected to the one or more DC power connections 304 or one or more AC power connections 306, respectively. In other operating modes power may be routed from the battery to various load in the system 300. A first power conditioning module 314 may optionally be an AC to DC converter. The first power conditioning module 314 receives the unregulated, three-phase AC power from AC power source 132 and generates clean, stable, regulated and conditioned DC power (e.g., 24 VDC, 200 Amp). The regulated DC power is connected to the one or more DC power connections 304. The one or more DC power connections 304 may include, but not be limited to a DC battery charger. In another embodiment, the one or more DC power connections 304 may include a DC outlet, to which an operator can connect a DC load (e.g., soft drink pumps) or a DC load associated with the trailer, such as a lift gate.

A second power conditioning module 316 may optionally be employed as a DC to AC converter. The second power conditioning module 216 receives the clean, stable, regulated and conditioned DC power from the first power conditioning module 314 and produces clean, stable, regulated and conditioned AC power (e.g., 120/240 VAC, 20 Amp, 60 Hz). The regulated AC power is connected to the one or more AC power connections 306. The one or more AC power connections 306 may include an AC outlet, to which an operator can connect an AC load (e.g., cash registers, computers) or an AC load associated with the trailer (e.g., AC powered hand truck chargers).

Figure 4:
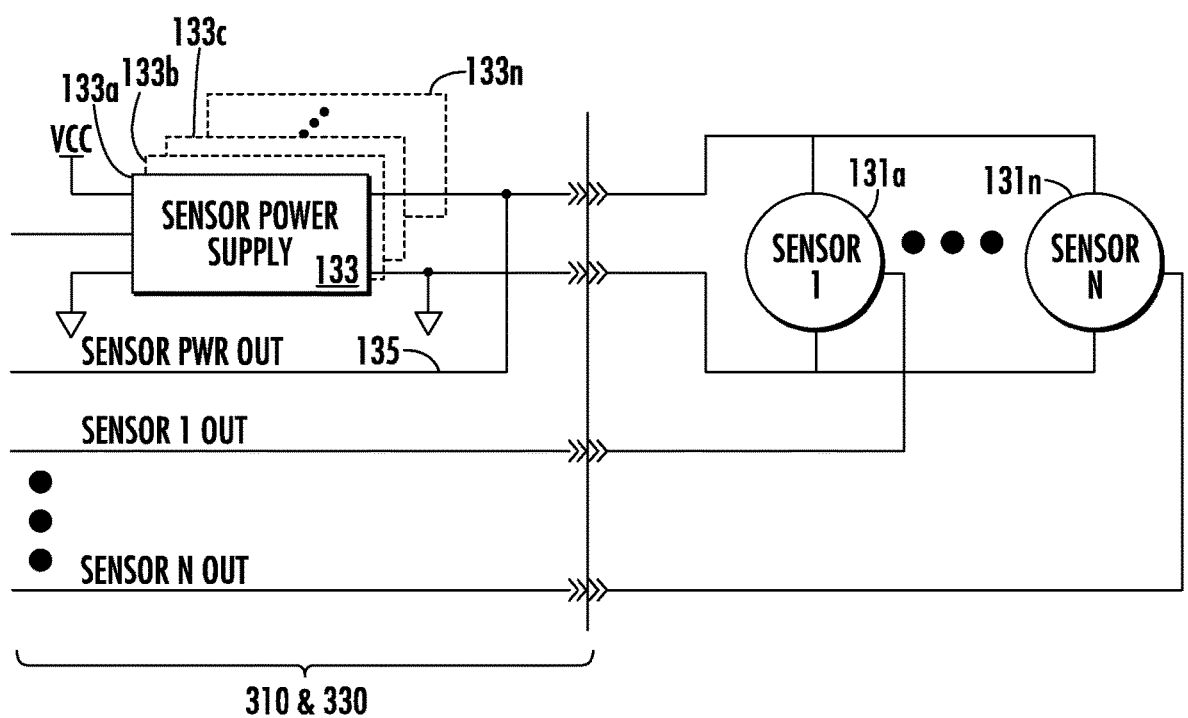
FIG. 4 depicts a simplified schematic of a group of sensor power supplies in a transport refrigeration power system in accordance with an embodiment.

Continuing with FIG. 3 and turning now to FIG. 4 as well, for details on the operation and function of the transport refrigeration power system 300 of an embodiment. The controller 330 executes a process for controlling, monitoring, routing and applying power in the power system 300. In an embodiment the controller 330 and/or the control device 310 includes a plurality of buffered sensor power supplies 133 to provide excitation to the various sensors 131 of the transport refrigeration system 100. The buffered sensor power supplies 133 may be integral and part of the controller 330 and/or the control device 310 or they could be separate. In an embodiment the buffered sensor power supplies 133 provide a stable regulated current limited supply voltage for the operation of the sensors 131$a$-131$n$. In addition, the buffered sensor power supplies 133 provide a voltage sense identified at line 135 that provides a voltage signal for diagnostics and evaluation of the operation of each of the buffered sensor power supplies 133. The diagnostic facilitates determining that the buffered sensor power supplies 133 are operating properly and not subject to any faults. Faults can include a short circuit in a sensor or harness interconnect for the sensor 131$a$-131$n$.

The sensors 131$a$-131$n$ provide sensor outputs to the controller 230 for measurement and detection of various operating parameters and characteristics of the system 120, 220. For example, sensors 131$a$-131$n$ may measure temperatures, pressures speeds, velocities, positions, and the like for the various components of the transport refrigeration system 120, 220. For example, in a transport refrigeration system 120, 220, sensors 131 may be employed to measure compressor discharge pressure, or evaporator temperature. In another embodiment, sensors may measure parameters associated with the transport refrigeration system as used in its application. For example, other sensor may measure humidity or oxygen concentration both parameters that are important for the refrigerated transportation of perishables.

In an embodiment, various sensors 131 are needed to determine a desired or selected control point for the transport refrigeration system 120, 220. Maintaining the selected control point, and operational parameters is important to achieve desirable system performance, achieve desired system functionality and avoid interruptions in service. Interruptions in service functionality or failing to maintain desired operational parameters reduces transport longevity of perishables and may lead to spoilage and loss of product. Inefficient operation and spoilage result in waste and loss of revenue. Therefore, maintaining overall operational reliability, desired functionality, and maintaining desired operational parameters is highly desired.

To ensure maintaining overall operational reliability, desired functionality, and maintaining desired operational parameters, the transport refrigeration system 120, 220 should be capable of operation with respect to a given design control point for the system. That is, it is desired that the system 120, 220 be configured to ensure a selected level of functionality for a given control function in spite of selected faults of selected sensors 131 or the power supply 133 employed to power them. To facilitate such a configuration, primary sensors 131 for operation of a given control function are isolated and powered by a first power supply 133$a$. Sensors 131 that would operate in some manner as a backup for that given control function are implemented on a segregated power supply 133$b$. Finally a 3rd category may be identified for a given embodiment as for sensors not related to critical system functions, such as options, and these too would be on yet another segregated power supply denoted 133$c$. In an embodiment additional segregated power supplies 133$n$ may be employed as needed or desired. It should be appreciated that while three power supplies are depicted and described herein, such description is merely illustrative. Any number of segregated power supplies may be employed including, and not limited to employing separate power supplies 133$a$-133$n$ for each sensor 131 as desired based on operation, criticality, and the like.

Figure 5:
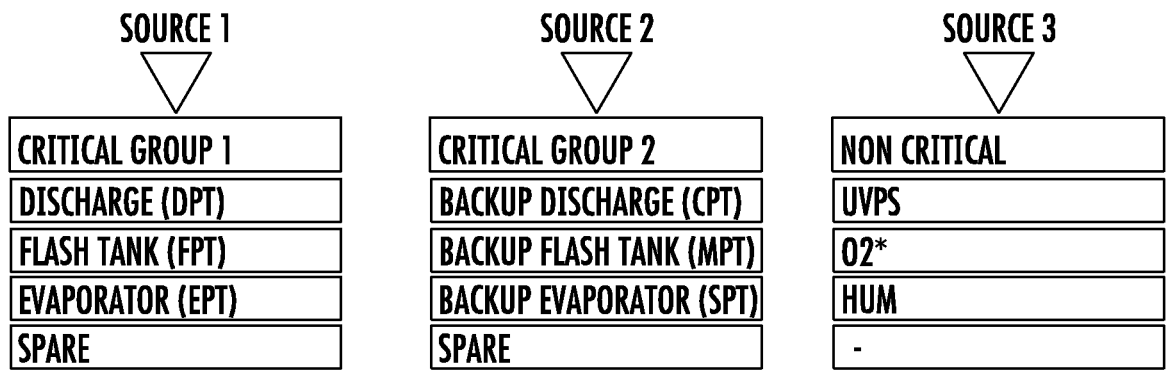
FIG. 5 depicts an example of sensor signal segregation in accordance with an embodiment.

Referring now to FIG. 5, in an embodiment, the sensor groupings and criticality are determined at the functional level system 120, 220. For example, on one embodiment criticality is selected as being related to the operation of the refrigeration system 120, 220, and it is not necessarily a cargo centric determination. In other words, the refrigeration system 120, 220 is configured in such an embodiment to define criticality based on maintaining operation refrigeration system 120, 220 (even if it is not the most functional, accurate, most efficient, desirable operation, and the like), regardless of what sensors associated with the cargo might indicate. For example, in some systems, O2 sensors 131 or CO2 sensors 131 that may be considered more critical to the cargo would perhaps be considered critical to the customer, however may not be considered as important to the functional operation of the transport refrigeration system 120, 220, because the refrigeration system 120, 220 would continue to maintain robust operation without them.

For example, as depicted in FIG. 5, the refrigeration system 120, 220 typically requires superheat monitoring at the evaporator 128 to ensure general efficiency, and limit degradation due to flooding the compressor 122. To that end, in an embodiment, the refrigeration system 120, 220 design includes an evaporator pressure sensor 131 at the evaporator 128 as the primary component for this purpose. In addition, the refrigeration system 120, 220 typically requires pressure ratio monitoring of the compressor 122. To that end, the refrigeration system 120, 220 design includes a compressor suction port pressure sensors 131 as the primary component for this purpose. Advantageously, each of these parameters, and therefore the sensors 131 can operate as functional backups for each other. That is, the suction port pressure, and thereby its sensor 131 at the compressor 122 can be used to facilitate superheat monitoring, and the evaporator pressure, and thereby its sensor 131 can facilitate pressure ration determination.

In operation, to implement the example above, the two pressure sensors 131 may be configured to operate from two different power supplies 133. As a result, if a fault occurs in either the sensor 131 or the power supply 133 (single point), including any interconnections, e.g., open wire, short circuit on power supply 133 or sensor 131, and the like, such faults are detectable, and a functional backup sensor 131 and/ second power supply 133 remains available to ensure that the refrigeration system 120, 220 continues to operate without further degradation or failure. Moreover, advantageously, if a fault occurs in either the sensor 131 or the power supply 133 (single point), including any interconnections, that impacts a power supply 133, the power supplies are isolated and configured to operate independently so that such a fault does not impact other power supplies 133.

Similarly, the refrigeration system 120, 220 may require pressure monitoring at the flash tank (not shown) to control of the flow of refrigerant into the mid-stage circuit which may or may not include an economizer circuit, or an intercooler, and the prevention of over pressurization of the flash tank. To that end, in an embodiment, the refrigeration system 120, 220 design includes a pressure sensor 131 at the input flash tank as the primary component for this purpose. In addition, the refrigeration system 120, 220 typically requires mid-stage pressure at outlet of the compressor economizing circuit, e.g., the mid-stage/second stage inlet to the compressor, for a two stage compressor system to more accurately determine the quality of the refrigerant in this area of the system. To that end, the refrigeration system 120, 220 design includes a mid-stage pressure sensor 131 as the primary component for this purpose. It should be clear from the above that in the general case, the flash tank pressure would represent the input side of the mid-stage, and the mid-stage pressure would represent the output side of the mid-stage. Advantageously, once again, each of these parameters, and therefore the sensors 131 can operate as functional backups for each other. That is, the mid-stage pressure, and thereby its sensor 131 at the mid-stage on the compressor 122 can be used to facilitate flash tank pressure monitoring, and the flash tank pressure, and thereby its sensor 131 can facilitate the mid-stage pressure determination. Therefore, as described above and for similar reasons, the flash tank pressure sensor 131 is supplied from a first power source 133a, while the mid-stage pressure sensor 131 (operating as a back-up for flash tank pressure) is segregated and operated a second power source (e.g., 133b).

Furthermore, the refrigeration system 120, 220 typically requires compressor pressure ratio monitoring at the compressor 122 to assure general efficiency, and limit degradation due to flooding the compressor 122 as well as overheating in the compressor 122. To that end, in an embodiment, the refrigeration system 120, 220 design includes a pressure sensor 131 at the evaporator 128 outlet as the primary component for this purpose. In addition, the refrigeration system 120, 220 may also employ a suction pressure at the compressor 122 primarily for compressor 122 envelope controls, including pressure ratio. In many instances, evaporator outlet pressure and compressor suction pressure are similar in that they are only separated by a length of piping. In some systems this length can be very small and the differences between evaporator outlet pressure and compressor suction port pressure are very small. However in other systems where there is a long length of piping there can be differences between the two. To provide for measuring compressor suction pressure, the refrigeration system 120, 220 design may include a pressure sensor 131 at the suction port of the compressor 122 as the primary component for this purpose. Once again, advantageously, each of these parameters, and therefore the sensors 131 can operate as functional backups for each other in selected instances and configurations. That is, the compressor suction port pressure, and thereby its sensor 131 at the compressor 122 can be used to facilitate evaporator outlet pressure monitoring, and the evaporator pressure, and thereby its sensor 131 can facilitate pressure ratio monitoring at the compressor 122. Therefore, as described above and for similar reasons, the evaporator pressure sensor 131 is supplied from a first power source 133a, while the compressor suction port pressure sensor (operating as a back-up for evaporator pressure) is segregated and operated a second power source, e.g., 133b.

In some instances the refrigeration system 120, 220 may employ select sensors 131 that are of a non-critical nature to a particular operational control point. Such sensors 131 may be grouped and powered separately as needed. For example, excess humidity can have a detrimental impact on some cargo so control of humidity can improve longevity of certain types of cargo. Therefore, in some embodiments a humidity sensor 131 is commonly employed in refrigeration systems 120, 220 for dehumidification purposes. In some embodiments there is no need to provide functional backup for the system function provided for by the humidity sensor 131. However, isolating this sensor 131 and power supply e.g., 133c from other more sensors 131 and components, considered more critical to functionality of the system function, and their backups, as well as the power supplies 133a, 133b, ensures refrigeration system 120, 220 functionality should a fault in this sensor 131 or power supply 133c be detected. Examples of non-critical sensors 131 may include, but not be limited to humidity, O2, or status of an air cleaner such as an ultraviolet particle air particle separator, and the like, as may be employed in the transport refrigeration system 120, 220.

Figure 6:
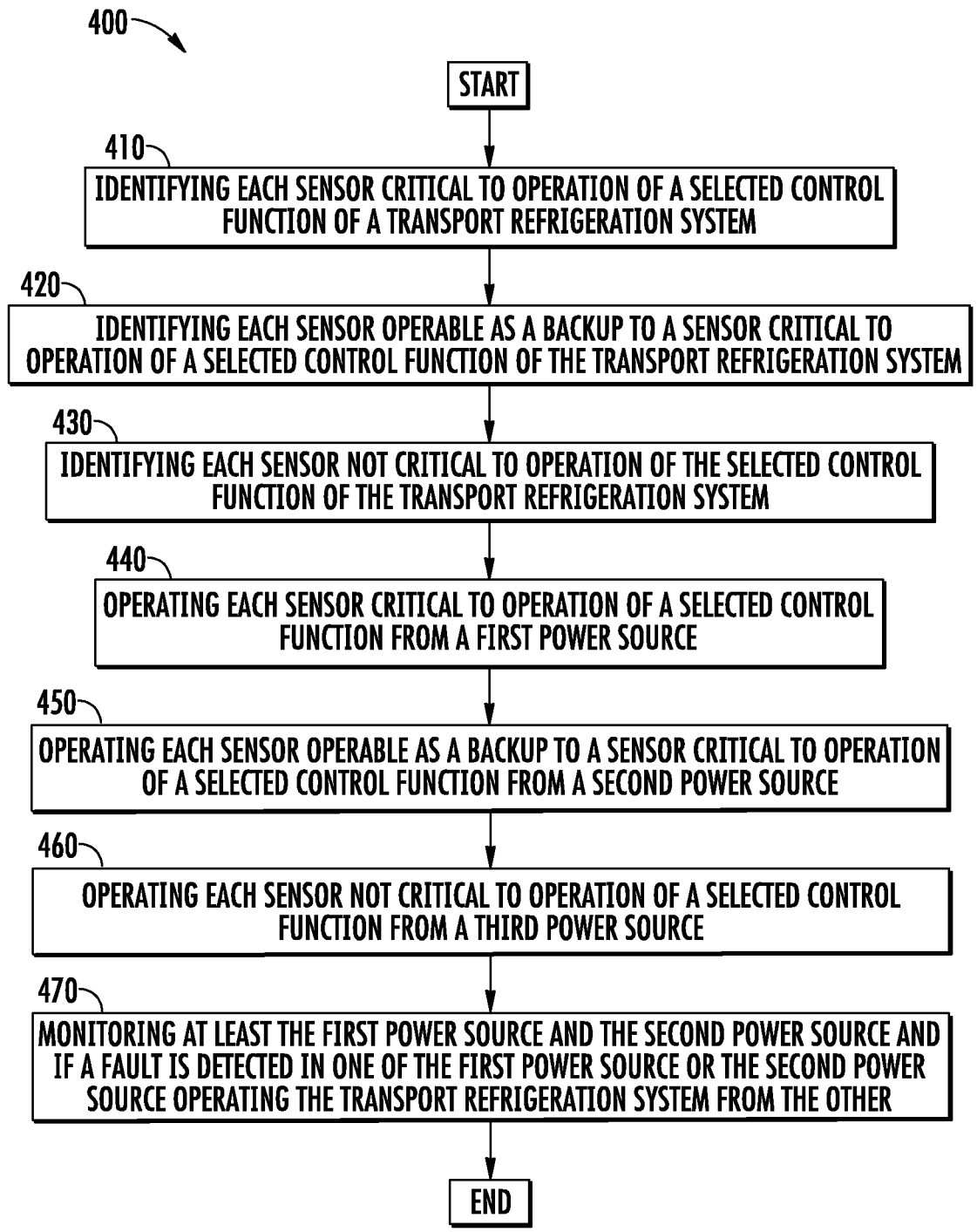
FIG. 6 is a flowchart of a process for power supply management in the transport refrigeration system in accordance with an embodiment.

FIG. 6 depicts a flowchart of a method 400 of fault tolerant power distribution for a transport refrigeration system 120, 220. The method 400 initiates at process step 410 with identifying each sensor 131 critical to operation of a selected control function for the transport refrigeration system 120, 220 and more specifically the power system 300. Each sensor 131 operable as a back-up to each sensor 131 critical to operation of a selected control function for the transport refrigeration system 120, 220 is identified at process stem 420. At process step 430 the method 400 continues with identifying each sensor 131 not critical to operation of a selected control function for the transport refrigeration system 120, 220. At process step 440 the method 400 continues with operating each sensor 131 critical to operation of a selected control function for the transport refrigeration system 120, 220 from a first power source 133a. Next, as depicted by process step 450, the sensors 131 operable as backup to the sensors 131 critical to operation of a selected control function for the transport refrigeration system 120, 220 are operated and powered from a second power source 133b. As depicted at process step 460 the sensors 131 not critical to operation of a selected control function for the transport refrigeration system 120, 220 are operated and powered from a third power source 133c. As described earlier, to facilitate the desired operation of the transport refrigeration system 120, 220 and the fault tolerance desired, the first power supply 133a, second power supply 133b, and third power supply 133c, (and so on for as many power supplies 133 as desired) are segregated and independent of one another. At process step 470, at least the first power source and the second power source is monitored. If a fault is detected in one of the first power source and the second power source, the transport refrigeration system is operated from the other of the first power source and the second power source.

While the disclosure has been provided in detail in connection with only a limited number of embodiments, it should be readily understood that the present disclosure is not limited to such disclosed embodiments. Rather, embodiments can be modified to incorporate any number of variations, alterations, substitutions, combination, sub-combination, or equivalent arrangements not heretofore described, but which are commensurate with the spirit and scope of the disclosure. Additionally, while various embodiments have been described, it is to be understood that aspects of the disclosure may include only some of the described embodiments. Accordingly, embodiments are not to be seen as limited by the foregoing description, but only limited by the scope of the appended claims.

What is claimed is:

1. A transport refrigeration system comprising:
    a first sensor operable as required for operation of the transport refrigeration system;
    a second sensor operable as a backup for the first sensor;
    a third sensor operable as not required for operation of the transport refrigeration system;
    a first power supply operably connected to the first sensor and configured to operate the first sensor;
    a second power supply operably connected to the second sensor and configured to operate the second sensor;
    a third power supply operably connected to the third sensor and configured to operate the third sensor; and
    a controller operably connected to at least the first power supply as well as the first sensor and the second power supply as well as the second sensor, the controller configured to monitor at least the first power supply and the second power supply, if a fault is detected in the first power supply, operate the transport refrigeration system from the second sensor.

2. The transport refrigeration system of claim 1, wherein the first sensor is at least one of a discharge pressure sensor, a flash tank pressure sensor, or an evaporator pressure sensor.

3. The transport refrigeration system of claim 1, wherein the second sensor is at least one of a condenser pressure sensor, a mid-stage pressure sensor, or a compressor suction port pressure sensor.

4. The transport refrigeration system of claim 1, further including at least one of a fourth sensor or a fifth sensor, the at least one of the fourth or the fifth sensor operably connected to the first power supply.

5. The transport refrigeration system of claim 4, wherein at least one of the fourth sensor or the fifth sensor is at least one of a discharge pressure sensor, a flash tank pressure sensor, or an evaporator pressure sensor.

6. The transport refrigeration system of claim 1, further including at least one of a sixth sensor or a seventh sensor, the at least one of the sixth sensor or the seventh sensor operably connected to the second power supply.

7. The transport refrigeration system of claim 6, wherein at least one of the sixth sensor or the seventh sensor is at least one of a condenser pressure sensor, a mid-stage pressure sensor, or an compressor suction port pressure sensor.

8. The transport refrigeration system of claim 1, further comprising, if a fault is detected in the second power supply, operate the transport refrigeration system from the first sensor.

9. The transport refrigeration system of claim 1, wherein the third power supply is independent of the first power supply and the second power supply.

10. The transport refrigeration system of claim 1, wherein the first power supply is independent of the second power supply.

11. A method of fault tolerant power distribution for a transport refrigeration system, the method comprising:
    identifying a first sensor operable as required for operation of the transport refrigeration system;
    identifying a second sensor operable as a backup for the first sensor;
    identifying a third sensor operable as not required for operation of the transport refrigeration system;
    operating the first sensor from a first power supply operably connected to the first sensor;
    operating a second sensor from a second power supply operably connected to the second sensor;
    operating the third sensor from a third power supply operably connected to the third sensor; and
    monitoring at least the first power supply and the second power supply, the first power supply as well as the first sensor and the second power supply as well as the second sensor operably connected to a controller, if a fault is detected in the first power supply, operate the transport refrigeration system from the second sensor.

12. The method of fault tolerant power distribution of claim 11, wherein the first sensor is at least one of a discharge pressure sensor, a flash tank pressure sensor, or an evaporator pressure sensor.

13. The method of fault tolerant power distribution of claim 11, wherein the second sensor is at least one of a condenser pressure sensor, a mid-stage pressure sensor, or a compressor suction port pressure sensor.

14. The method of fault tolerant power distribution of claim 11, further comprising operably connecting at least one of a fourth sensor or a fifth sensor to the first power supply.

15. The method of fault tolerant power distribution of claim 14, wherein at least one of the fourth sensor or the fifth sensor is at least one of a discharge pressure sensor, a flash tank pressure sensor, or an evaporator pressure sensor.

16. The method of fault tolerant power distribution of claim 11, further comprising at least one of a sixth sensor or a seventh sensor, the at least one of the sixth sensor or the seventh sensor operably connected to the second power supply.

17. The method of fault tolerant power distribution of claim 16, wherein at least one of the sixth sensor or the seventh sensor is at least one of a condenser pressure sensor, a mid-stage pressure sensor, or an compressor suction pressure sensor.

18. The method of fault tolerant power distribution of claim 11, further comprising if a fault is detected in the second power supply, operate the transport refrigeration system from the first sensor.

19. The method of fault tolerant power distribution of claim 11, wherein the third power supply is independent of the first power supply and the second power supply.

20. The method of fault tolerant power distribution of claim 11, further comprising wherein the first power supply is independent of the second power supply.

* * * * *